(12) United States Patent
Untch et al.

(10) Patent No.: US 9,511,884 B2
(45) Date of Patent: Dec. 6, 2016

(54) DISCHARGE METHOD AND DISCHARGE DEVICE FOR DISCHARGING AN AT LEAST PARTIALLY FLEXIBLE CONTAINER WITHOUT CONTAMINATION

(71) Applicant: FLECOTEC AG, Müllheim (DE)

(72) Inventors: Günter Untch, Müllheim (DE); Peter Lais, Müllheim (DE); Martin Koch, Neuenburg (DE)

(73) Assignee: FLECOTEC AG, Meullheim (DE)

( * ) Notice: Subject to any disclaimer, the term of this patent is extended or adjusted under 35 U.S.C. 154(b) by 225 days.

(21) Appl. No.: 13/261,854

(22) PCT Filed: Nov. 13, 2012

(86) PCT No.: PCT/DE2012/100346
§ 371 (c)(1),
(2) Date: May 9, 2014

(87) PCT Pub. No.: WO2013/071924
PCT Pub. Date: May 23, 2013

(65) Prior Publication Data
US 2014/0314527 A1    Oct. 23, 2014

(30) Foreign Application Priority Data
Nov. 14, 2011   (DE) .................. 10 2011 086 278

(51) Int. Cl.
*B65G 65/00* (2006.01)
*B65B 1/28* (2006.01)
*B65B 69/00* (2006.01)
*B65G 69/18* (2006.01)

(52) U.S. Cl.
CPC ............ *B65B 1/28* (2013.01); *B65B 69/0075* (2013.01); *B65G 69/18* (2013.01)

(58) Field of Classification Search
CPC .. B65G 69/181; B65G 69/183; B65G 69/18; B65B 69/0075; B65B 69/0008; B65B 9/15; B65B 69/0033; B65B 69/0041
USPC ........ 414/292, 808, 411, 412; 141/329, 330, 141/114; 53/492, 381.2; 222/81, 83, 83.5, 222/88
See application file for complete search history.

(56) References Cited

U.S. PATENT DOCUMENTS 5,405,053 A    4/1995   Zublin
5,890,781 A *   4/1999   Ryder ..................... B65B 69/00
                                                    312/1

(Continued)

FOREIGN PATENT DOCUMENTS

DE    10 2004 005 961 A1    7/2005
DE    10 2006 051513 B3    8/2007

(Continued)

*Primary Examiner* — Michael McCullough
*Assistant Examiner* — Mark Hageman
(74) *Attorney, Agent, or Firm* — Wenderoth, Lind & Ponack, L.L.P.

(57) ABSTRACT

A discharge method discharges an at least partially flexible container without contamination. The container (1) is discharged into a base body (10). A liner (20) encloses a filling opening (11) of the base body (10) and is secured to the base body (10). A filling end (21) of the liner (20) is folded inwards such that a receiving region forms for the container (1). The receiving region is sealed such that a discharge opening formed by a knife (15) allows the container (1) to be discharged while being completely sealed off to the exterior.

13 Claims, 8 Drawing Sheets

(56) References Cited

U.S. PATENT DOCUMENTS

| | | | |
|---|---|---|---|
| 7,587,882 B2 * | 9/2009 | Rocholl | B65B 69/0008 414/412 |
| 8,409,390 B2 * | 4/2013 | Untch | B65B 1/28 156/251 |
| 2005/0232731 A1 * | 10/2005 | Lund | B65B 69/0041 414/288 |
| 2008/0145198 A1 | 6/2008 | Multer et al. | |
| 2010/0012225 A1 * | 1/2010 | Schnyder | B65B 1/28 141/370 |

FOREIGN PATENT DOCUMENTS

| | | |
|---|---|---|
| DE | 10 2010 050 877 A1 | 5/2012 |
| EP | 2 168 881 A2 | 3/2010 |
| GB | 2 306 376 A | 5/1997 |
| WO | WO 2008/078221 A1 | 7/2008 |
| WO | WO 2010/118817 A1 | 10/2010 |

* cited by examiner

DISCHARGE METHOD AND DISCHARGE DEVICE FOR DISCHARGING AN AT LEAST PARTIALLY FLEXIBLE CONTAINER WITHOUT CONTAMINATION

FIELD OF THE INVENTION

The invention relates to a discharge method and a discharge device for discharging an at least partially flexible container without contamination.

BACKGROUND OF THE INVENTION

In the further processing of raw materials that would pose a significant health hazard for those persons working with these substances in the event of direct contact therewith, care must be taken to ensure increased cleanliness and absolutely contamination-free work in many industries, for example in the pharmaceutical or chemical industry. Even in the case of lower requirements in terms of freedom from contamination, considerable effort has thus far been invested in making the discharging of at least partially flexible containers into a production unit or an additional flexible container possible. In most cases, known insulators are used at appropriate interfaces.

Known methods or devices are disclosed for example in DE 10 2009 017 545 A1 or DE 10 2006 057 760 B3.

In the case of the device known from DE 10 2006 057 760 B3, a liner that encloses a filling opening of a base body is attached to the base body.

This manner of attachment does not solve the problem of the docking of sealed, at least partially flexible containers however.

SUMMARY OF THE INVENTION

An object of the invention is to provide a cost-effective, easy to handle and absolutely clean method and a device for implementing the method for the environmentally sealed connection of at least partially flexible containers to a processing system, in particular without contamination.

This object is basically achieved according to the invention by a method or by a device where an environmentally-sealed connection, also referred to as contamination-free docking, of an at least partially flexible container can be established to a processing system, which device has a filling opening in a base body. The use of an insulator is not necessary. The invention allows docking any containers, which have at least one flexible region, which region can be cut, for example by a blade, for example, a metal container having a film bottom that is heat-sealed on.

Pursuant to the method according to the invention, the flexible region of the container is oriented facing the filling opening. If the container is completely flexible, such as a bag, the method does not depend on a particular orientation.

The method according to the invention permits the container to be contained in a liner.

A person skilled in the art understands the term 'liner' to refer to a kind of tube or tubular film. The liner is provided as a continuous liner in a liner cassette, for example. The liner is folded together in the liner cassette in a space-saving manner. In the case of known filling openings, the line cassette is attached to the base body such that it encloses the filling opening.

The method comprises the following process steps:

The liner may be drawn out of the liner cassette at a specific starting length at a filling end sealed over the filling opening before the method begins. The liner is then folded inward, in particular the filling end thereof. Thus, the liner still seals the filling opening. A receiving area is created, into which the container may be completely inserted.

The container is inserted into the receiving area, after which an at least double-walled end of the liner mostly extends over the container. If necessary, the liner must be drawn further out of the liner cassette. However, at least double-walled end need not protrude when crimping or heat sealing the at least double-walled end together with the container is possible.

The liner is subsequently sealed so that the receiving area is sealed.

The liner is subsequently opened, in particular cut open, on the side facing the filling opening, especially preferably at the filling end thereof, which is folded inward. At the same time, the container is cut open so that a largely corresponding discharge opening of the container as well as of the liner lie one on top of the other. A bag opening that allows the contents of the container to pass through is thereby created between the container and the filling opening. The receiving area, which is open to the filling opening, thereby remains closed to the exterior.

Finally, the container is discharged.

In an advantageous embodiment of the method according to the invention, after the cutting open of the liner and of the container, the liner is withdrawn from the filling opening, bringing the container with it. Especially advantageously, this step can occur immediately after the cutting open and during the discharging.

In a further advantageous embodiment of the method, after the discharging, the liner is sealed between the container and the filling opening in at least one sealing region. This step may be done by heat sealing or crimping.

In a further advantageous embodiment of the method according to the invention, after being sealed within the sealing region, or between two sealing regions created spaced apart from one another, the liner is separated at a cutoff point. A sealed end is then available on the side of the filling opening as a filling end.

Such methods according to the invention are more cost effective than known methods, since no insulator is needed to discharge the container in a contamination-free manner. The material originally contained in the container is kept sealed in at all times. The discharged container, which has often not been completely discharged, can also be provided completely sealed for disposal.

Pursuant to an advantageous embodiment of a discharge device for the discharge method according to the invention, the filling opening is radially disposed enclosing a liner cassette having a liner on the base body. If the liner is sealed at the filling end, the entire base body is completely sealed by a corresponding attachment of the liner cassette to the base body. The liner can be drawn out of the liner cassette, away from the filling opening, in particular by a lifting and gripping device.

Pursuant to a further advantageous embodiment of the discharge device according to the invention, the filling opening is partially sealed by a catch grid.

In the event that the container becomes disengaged in the receiving area and the container threatens to fall into the filling opening through the discharge opening created by the cutting, a catch grid of this kind prevents a blockage of the processing system.

Pursuant to a further embodiment of the discharge device according to the invention, a cutting device is disposed in a region of the filling opening, in particular a lifting and cutting device having a blade that may be moved towards the container.

Pursuant to a further advantageous embodiment of the discharge device according to the invention, the blade is disposed on the side of the catch grid facing away from the container, and the catch grid has an opening disposed so that it corresponds to the blade. The blade can then be moved towards the container, penetrating through the catch grid.

A risk of injury, which in principle would be posed by the blade, is eliminated by an embodiment of this kind. Likewise, unintentional damage to the containers is prevented.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
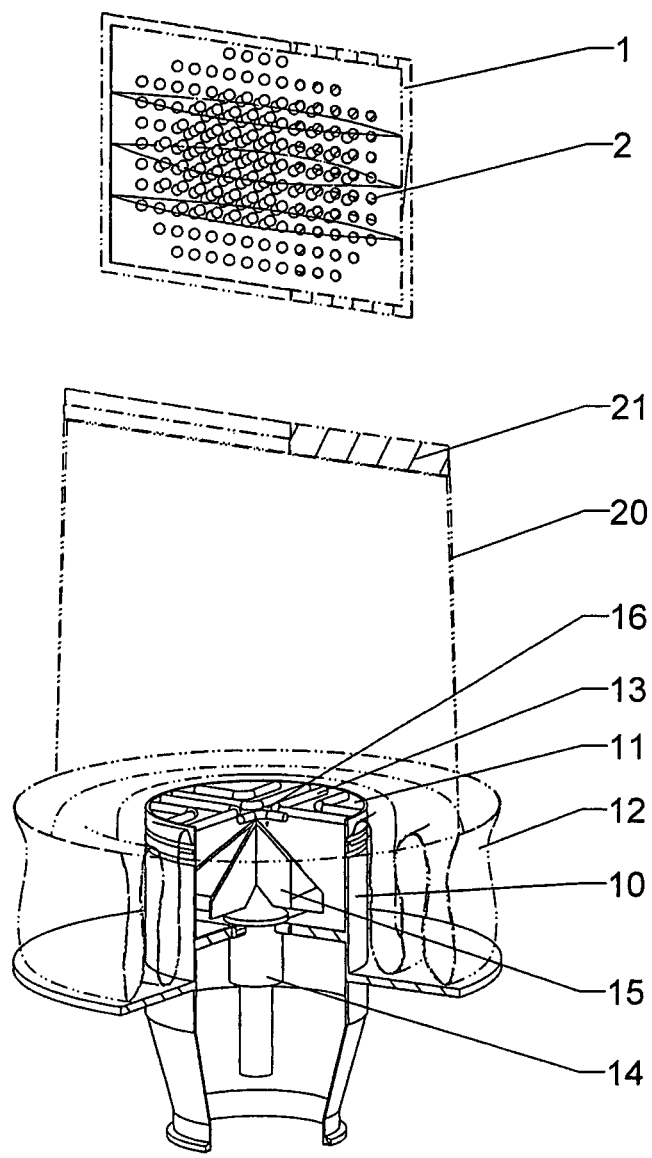
FIG. 1 is a schematic and simplified perspective view, partially in section, with approximately a quarter cut away in a circumferential direction of a container and of a discharge device disposed thereunder for a method according to an exemplary embodiment of the invention with a sealed filling end of a liner.

FIGS. 1 to 8 show a perspective view of an exemplary embodiment of a discharge device according to the invention, wherein a view of the inside of the discharge device is provided by a wedge cutout. FIGS. 1 to 8 disclose the discharge method when viewed in succession.

Pursuant to the embodiment shown, a discharge device provided for the discharge method according to the invention is integrated into connecting piece of a processing system, for example a connecting piece of a pipe or of a container. The discharge device has a base body 10, in which a filling or content receiving opening 11 is available for the filling of the system. A container 1 is depicted above the base body 10. The contents 2 of container 1 must be poured into the filling opening 11. To prevent contamination, the filling of the processing system (not completely shown) or the emptying of the container 1 respectively is carried out sealed off from the environment.

A liner cassette 12 is disposed such that it encloses the filling opening 11. Out of liner cassette, a tubular liner 20 can be drawn to the container 1. The liner, as a tube, is connected to the base body 10 in a manner that is sealed off from the environment by the continuous liner cassette 12. The liner may be drawn upward, out of the liner cassette 12, towards the container 1.

The end of the liner 20 that may be drawn out of the liner cassette 12 is referred to as the filling end 21. This filling end is sealed by a heat-sealed seam. Alternatively, the filling end may be crimped.

Figure 2:
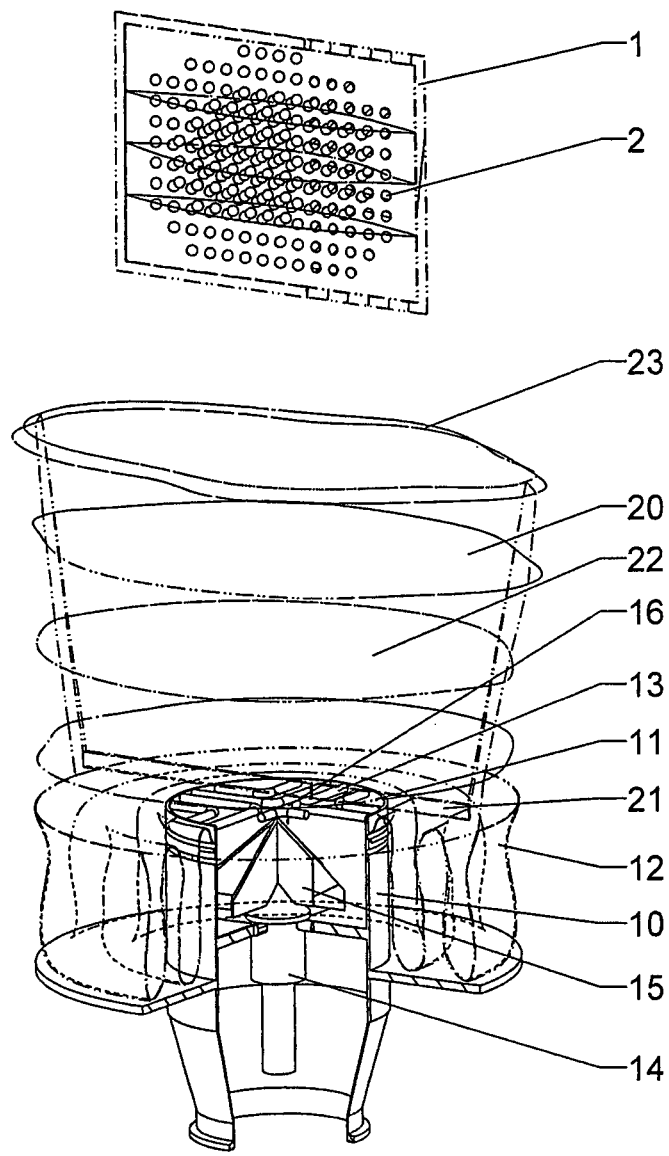
FIG. 2 is a schematic and simplified perspective view, partially in section, with approximately a quarter cut away in a circumferential direction of the discharge device from FIG. 1 with a filling end that is folded inward.

FIG. 2 shows how the filling end 21 is folded inward to form a receiving area 22.

Figure 3:
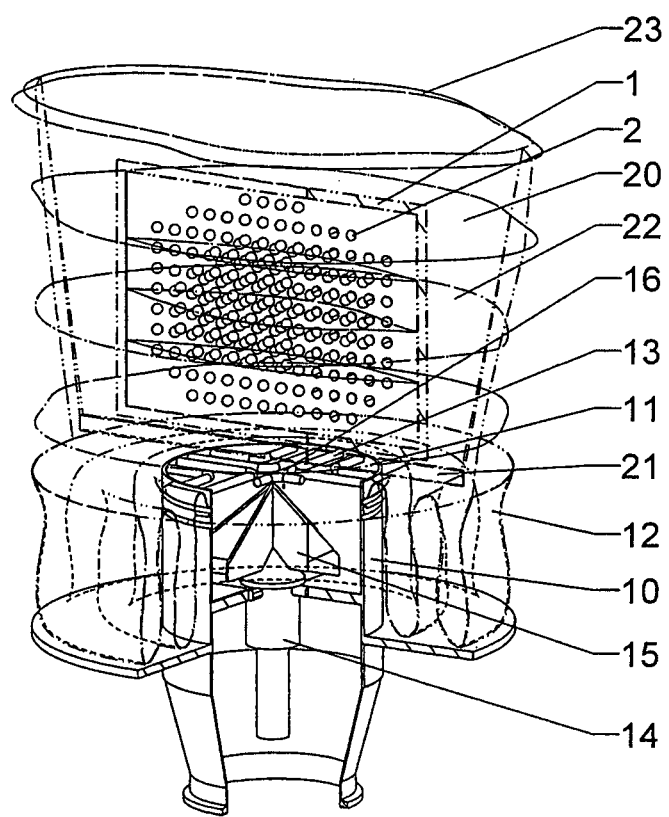
FIG. 3 is a schematic and simplified perspective view, partially in section, with approximately a quarter cut away in a circumferential direction of the discharge device from FIG. 2 with an inserted container.

FIG. 3 shows that the container 1 can be completely inserted into the receiving area 22.

The contours of the container 1 as well as of the liner 20 that are not visible are illustrated with a dashed line in all of the figures. The contents 2 of the container, typically a fluid or a granular material, are indicated by circles.

Figure 4:
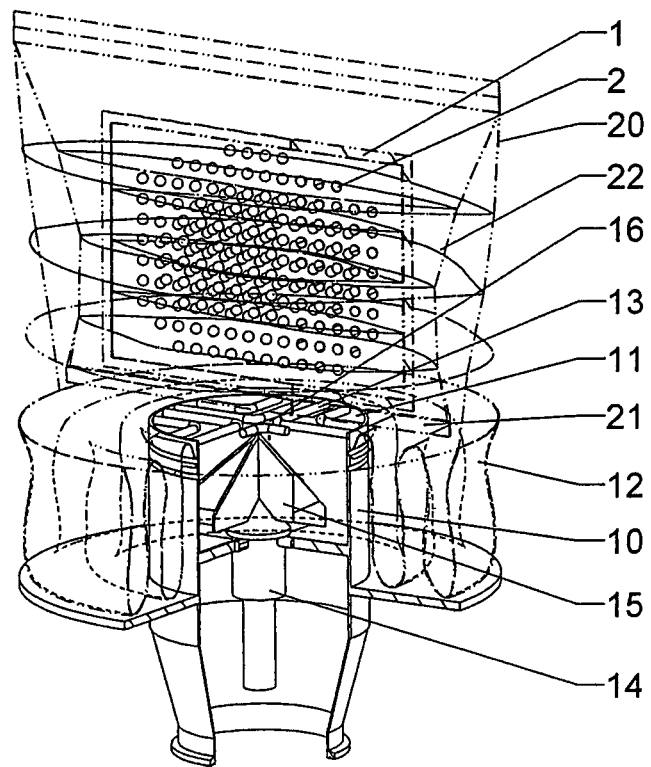
FIG. 4 is a schematic and simplified perspective view, partially in section, with approximately a quarter cut away in a circumferential direction of the discharge device from FIG. 3 with a receiving area sealed around the container.

FIG. 4 shows the receiving area 22 after a double-walled end 23 that protrudes over the container 1 has been sealed. The container 1 is closed off such that it may essentially be moved freely in the receiving area 22. In especially advantageous embodiments, the container is fixed in the receiving area 22, in particular by sealing the double-walled end 23 by heat sealing.

Figure 5:
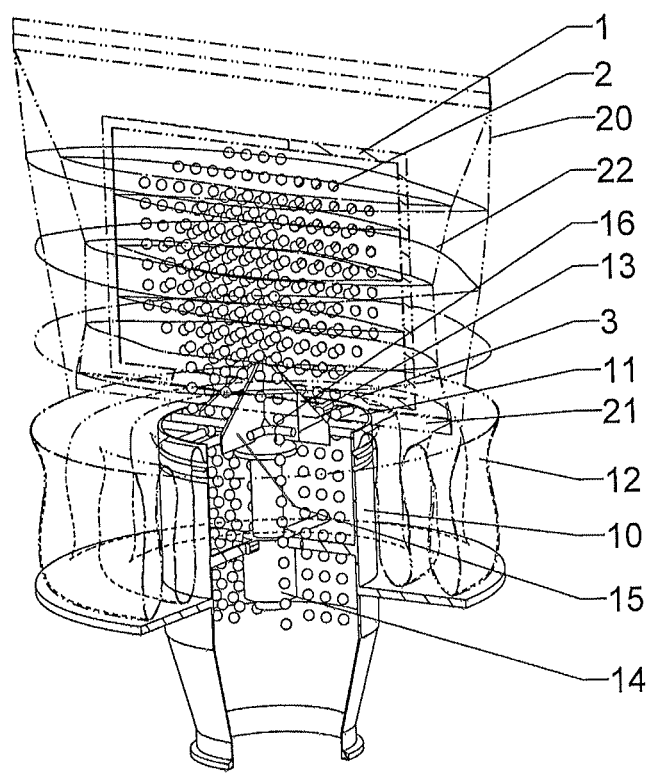
FIG. 5 is a schematic and simplified perspective view, partially in section, with approximately a quarter cut away in a circumferential direction of the discharge device from FIG. 4 with a blade in penetrating the filling end and the container.
Figure 6:
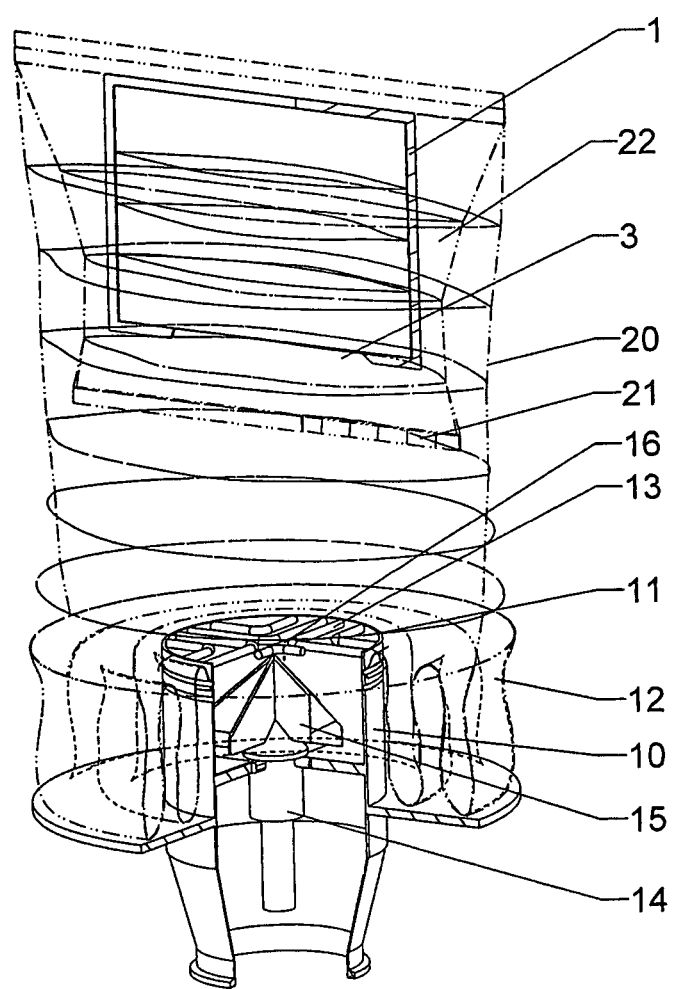
FIG. 6 is a schematic and simplified perspective view, partially in section, with approximately a quarter cut away in a circumferential direction of the discharge device from FIG. 5 with a withdrawn container.
Figure 7:
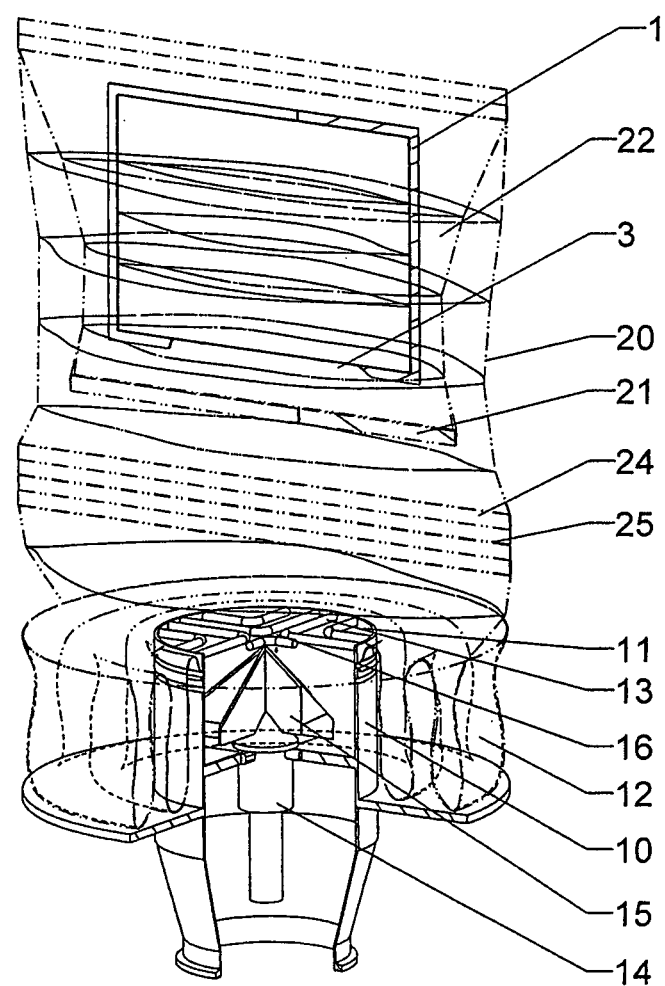
FIG. 7 is a schematic and simplified perspective view, partially in section, with approximately a quarter cut away in a circumferential direction of the discharge device from FIG. 5 with a withdrawn container and cutoff point.
Figure 8:
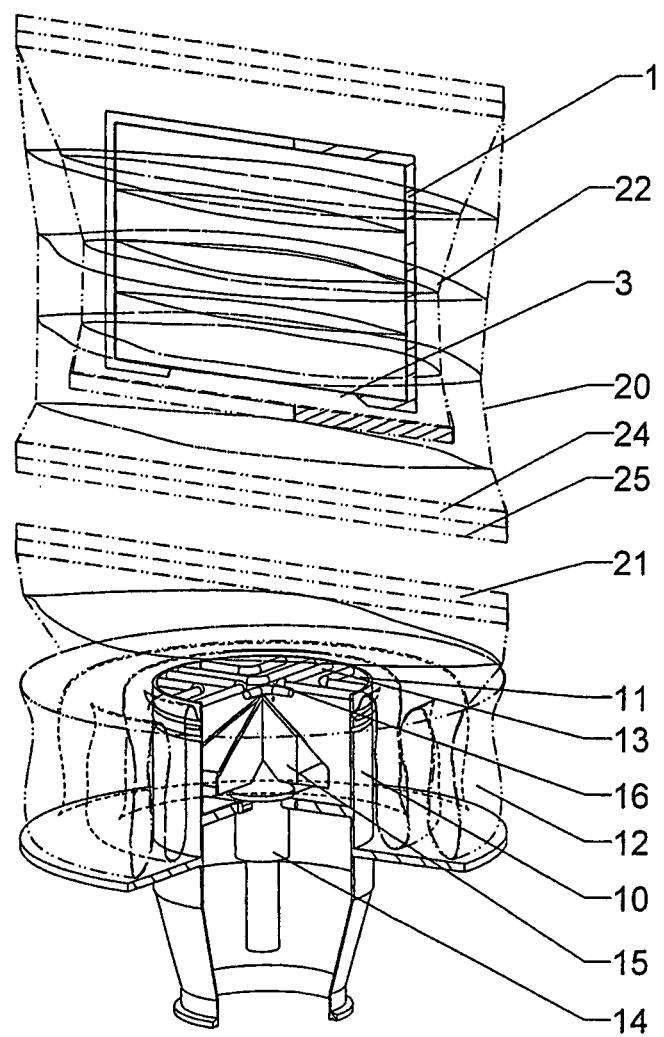
FIG. 8 is a schematic and simplified perspective view, partially in section, with approximately a quarter cut away in a circumferential direction of the discharge device from FIG. 7 with a separated filling end.

FIG. 5 shows how a blade 15 extends out of the filling opening 11, through catch grid 13, into the filling end 21 and into the container 1, so that the contents 2, indicated by circles, are discharged from the container 1 into the processing system.

After or during the discharging, the liner 20 is drawn further upward out of the liner cassette 12 at the double-walled end 23. A free region is formed as a sealing region 24 between the filling end 21 and filling opening 11. The sealing region 24 is created by crimping or heat sealing, in particular a double seam having a perforation. The perforation is a special form of cutoff point 25 in the sealing region 24. The cutoff point 25 may be disposed between two sealing regions that have been created.

REFERENCE SYMBOL LIST 1 container
2 contents
3 discharge opening
10 base body
11 filling opening
12 liner cassette
13 catch grid
14 cutting device
15 blade
16 opening
20 liner
21 filling end 22 receiving area
23 double-walled end
24 sealing region
25 cutoff point While one embodiment has been chosen to illustrate the invention, it will be understood by those skilled in the art that various changes and modifications can be made therein without departing from the scope of the invention as defined in the claims.

The invention claimed is:

1. A method for discharging contents from an at least partially flexible container without contamination, comprising the steps of:
    providing a liner enclosing a filling opening of a base body with the liner being attached to the base body;
    folding the liner inward and sealing the liner at a filling end of the liner, thereby sealing the filling opening and creating a receiving area in the liner;
    inserting completely the container into the receiving area with a double-walled end of the liner extending over the container and completely enclosing the container;
    sealing the liner to seal the receiving area;
    opening the liner in the receiving area and opening the container to form a discharge opening for allowing the contents of the container to pass through openings in the liner and the container, while the receiving area and the filling opening are sealed to an exterior thereof;
    discharging the contents of the container;
    sealing the liner between the container and the filling opening in a sealing region;
    separating the liner at a cutoff point within a sealing region or between two sealing regions of the liner; and
    spacing parts of said liner at the cutoff point from one another, providing a sealed end on a side of the filling opening as a filling end.

2. A method according to claim 1 wherein
after opening the liner in the receiving area, withdrawing the liner from the filling opening along with the container.

3. A method according to claim 2 wherein
the liner is withdrawn from filling opening along with the container directly after the cutting of the liner and during the discharging of the contents.

4. A method according to claim 1 wherein
the liner is provided in a liner cassette surrounding the filling opening; and
the liner is drawn from the liner cassette to enclose the filling opening.

5. A method according to claim 1 wherein
the filling opening is partially sealed by a catch grid.

6. A method according to claim 5 wherein
a cutting device having a blade is in a region of the filling opening, the blade is moved toward the liner and the container to open the liner in the receiving area and to open the container to form the discharge opening.

7. A method according to claim 6 wherein
the blade moves from a position on a side of the catch grid remote from the container and through an opening in the catch grid to engage and open the liner and the container.

8. A method for discharging contents from an at least partially flexible container without contamination, comprising the steps of:
    withdrawing a tubular liner from a liner cassette that surrounds a content receiving opening in a base body, said tubular liner being withdrawn along a longitudinal axis of the tubular liner and said content receiving opening, with the tubular liner and the content receiving opening being coaxial;
    folding the tubular liner inward and sealing the tubular liner at a discharge end of the tubular liner adjacent said content receiving opening to create a receiving area in the tubular liner;
    inserting the container with the contents therein in the receiving area of the tubular liner through an opening in an insertion end of the tubular liner spaced from the discharge end of the tubular liner;
    sealing the opening closed at the insertion end of the tubular liner to seal the receiving area with the container therein;
    cutting the tubular liner and the container at the discharge end of the tubular liner and discharging the contents of the container along the longitudinal axis out of the tubular liner and into the content receiving opening;
    further withdrawing the tubular liner from the liner cassette;
    forming a closure seal in the tubular liner between the container and the content receiving opening after discharging of the contents into the content receiving opening; and
    separating the tubular liner on a side of the closure seal facing the content receiving opening.

9. A method according to claim 8 wherein
the longitudinal axis is vertical.

10. A method according to claim 8 wherein
the separating of the tubular liner on the side of the closure seal facing the content receiving opening forms a new insertion opening for receiving another container with contents to be discharged.

11. A method according to claim 8 wherein
the content receiving opening has a catch grid.

12. A method according to claim 11 wherein
a cutting blade is moved from an inactive position on a side of the catch grid through the catch grid for the cutting of the tubular liner and the container at the discharge end of the tubular liner.

13. A method according to claim 8 wherein
a cutting blade is moved along the longitudinal axis from an inactive position on a side of the content receiving opening remote from the discharge end of the tubular liner through the content receiving opening for the cutting of the tubular liner and the container at the discharge end of the tubular liner.

* * * * *